United States Patent [19]

Baker

[11] Patent Number: 4,936,286
[45] Date of Patent: Jun. 26, 1990

[54] GAS BROILER

[75] Inventor: Edward D. Baker, San Francisco, Calif.

[73] Assignee: Nieco Corporation, a division of Alco Standard Corporation, Burlingame, Calif.

[21] Appl. No.: 433,554

[22] Filed: Nov. 8, 1989

[51] Int. Cl.⁵ .............................................. F24C 3/00
[52] U.S. Cl. ............................... 126/41 R; 126/41 C; 431/329; 99/386; 99/443 C
[58] Field of Search ................. 126/21 R, 21 A, 41 R, 126/41 C, 41 B, 41 D, 41 E, 91 R, 91 A, 85 R, 20.1; 99/386, 443 R, 443 C; 34/216, 217, 208; 431/202, 326, 329

[56] References Cited

U.S. PATENT DOCUMENTS

| 1,536,538 | 5/1925 | Stouffer | 126/41 C |
| 4,039,275 | 8/1977 | McGettrick | 431/329 |
| 4,176,589 | 12/1979 | Stuck | |
| 4,188,868 | 12/1980 | Baker et al. | |
| 4,332,189 | 6/1982 | Stuck | |
| 4,366,177 | 12/1982 | Wells et al. | |
| 4,473,004 | 12/1982 | Wells et al. | |
| 4,574,775 | 3/1986 | Lutzen et al. | 126/359 |
| 4,625,867 | 12/1986 | Guilbert | 126/21 A X |
| 4,776,319 | 10/1988 | Colangelo et al. | 126/214 D |

FOREIGN PATENT DOCUMENTS

A-88359/82  9/1982  Australia .

Primary Examiner—Larry Jones
Attorney, Agent, or Firm—Limbach, Limbach & Sutton

[57] ABSTRACT

A gas fired broiler having a plurality of burners adjacent to multiple conveyors with a shield on at least one of the burners in the area of one of the conveyors.

2 Claims, 2 Drawing Sheets

GAS BROILER

BACKGROUND OF INVENTION

This invention relates to gas fired broilers similar to those shown in U.S. Pat. No. 4,188,868 where a plurality of gas fired broilers are mounted on opposite sides of a conveyor for broiling food such as hamburger patties which are conveyed between the broilers. In machines of this type it is desirable to have a plurality of gas fired broiler units positioned on opposite sides of and periodically along the length of a conveyor chain to provide the proper heat distribution and broiling duration. In these machines it is desirable for manufacturing reasons that the plurality of broiler units be substantially identical and removable so that they can be fabricated easily and interchanged when they are removed for cleaning.

Food broilers of this type have been constructed with two parallel food conveyors such as those shown in the following U.S. Pat. Nos. 4,176,589; 4,332,189; 4,366,177; and 4,473,004. These multi-conveyor broilers may permit different foods to be broiled at the same time.

SUMMARY OF INVENTION

In accordance with this invention, a new broiler is provided which has the advantages of both the multi-conveyor broilers and the broilers with interchangeable broiling units. In the broiler of this invention, at least two broiling conveyors are arranged side by side, and broiler units are mounted adjacent to the conveyors extending across the combined widths of the two conveyors. In order to permit different heating conditions on the two conveyors while still permitting the broiler units to be interchangeable and made of interchangeable parts, a broiler unit is provided with a shield which blocks off the heated face of the broiler unit where the broiler unit faces one of the conveyors. The shield preferably carries a portion which extends towards the adjacent edges of two conveyors to prevent lateral heat radiation between the conveyors.

DETAILED DESCRIPTION

In the attached drawing, FIG. 1 is a longitudinal sectional view through a gas fired broiler of this invention;

Figure 1:
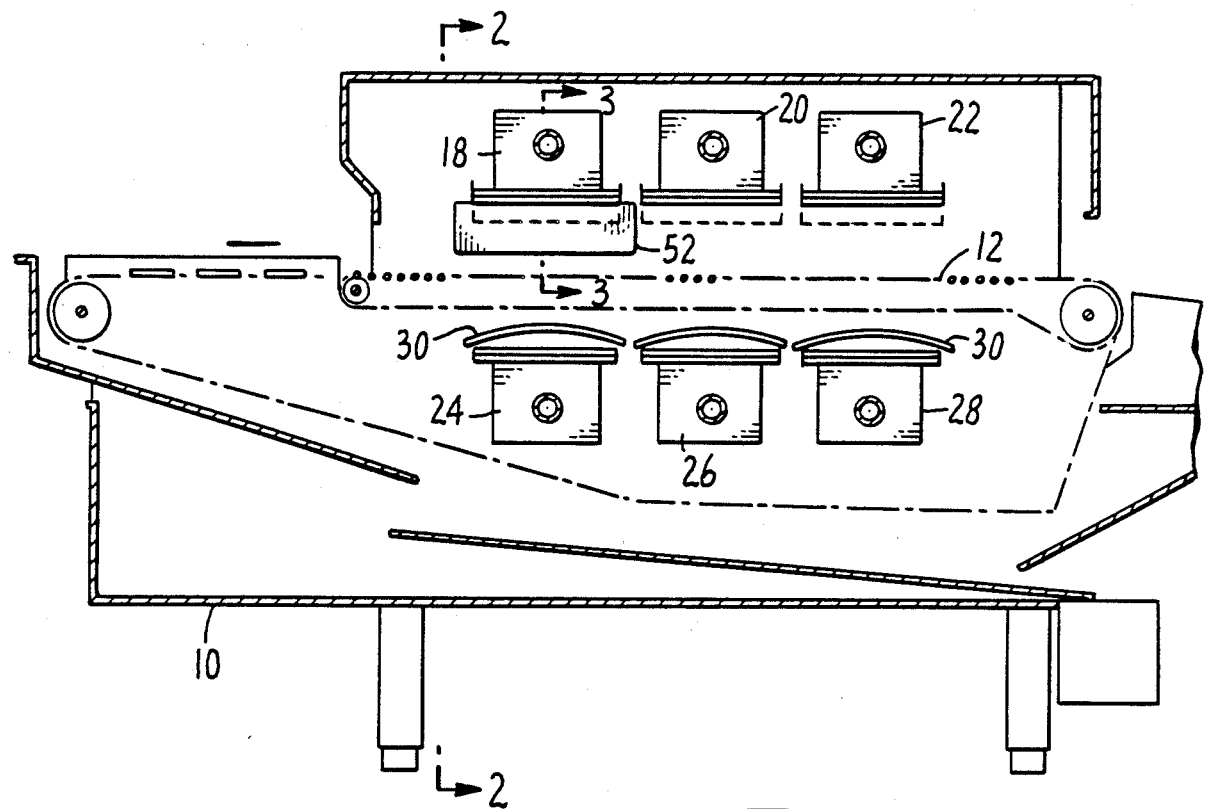

Referring now in detail to the drawing, the broiler includes a frame 10 supporting three side-by-side conveyors 12, 14, and 16 with conventional means (not shown), for driving the conveyors and feeding food to be cooked to and from the conveyors. The feeding means may be arranged to feed such diverse products as hamburger patties and tray cooked fish products simultaneously.

The broiler includes three upper broiler units 18, 20, and 22 and three lower broiler units 24, 26, and 28. The lower broiler units are provided with conventional shields 30 which protect the broiler units from falling grease, and the upper broiler units are fitted with conventional reverberators (not shown) consisting of large mesh screens removably covering the open sides of the broilers.

Conventional mounting means are provided for supporting the broiler units 18–28 in the positions illustrated in FIG. 1. Preferably the mounting means for the upper broilers consist of a shelf 32 (FIG. 2) at one end of the broiler and the gas supply pipe 34 at the other end of the broiler, and the mounting means for the lower broilers include a shelf 36 which supports the side flange of the broiler 24. The lower broilers may be removed from the unit for cleaning by removing a side wall of the broiler, and the upper broiler units may be removed by removing the top wall.

Figure 3:
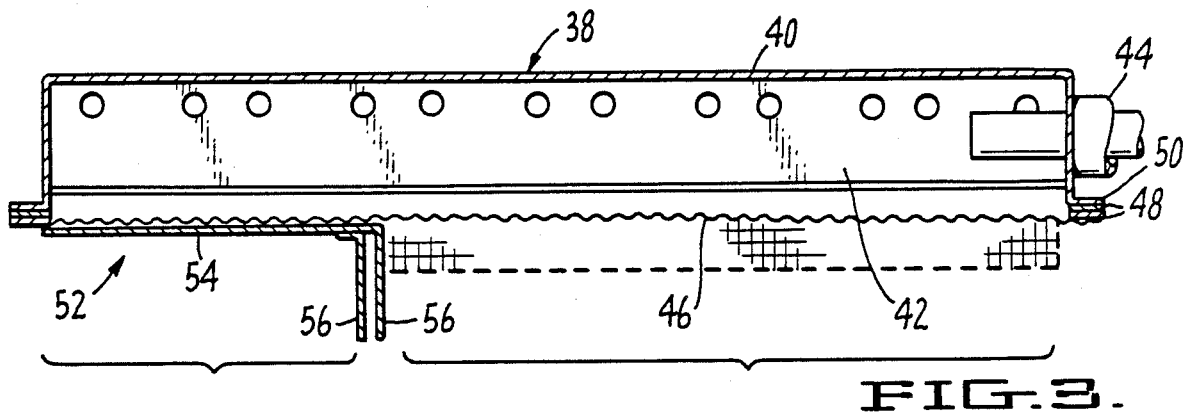
FIG. 3 is a sectional view taken on the plane indicated a 3—3 in FIG. 1.
Figure 4:
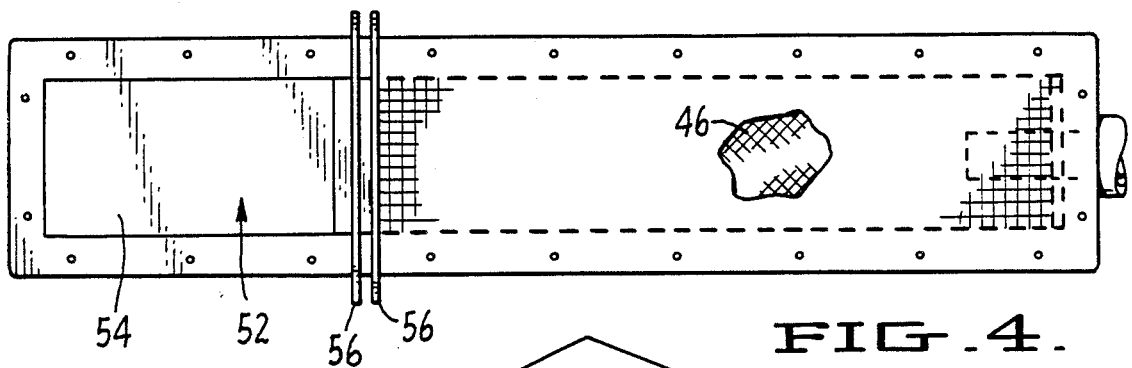
FIG. 4 is a view of the lower open side of the broiler in FIG. 3.
Figure 5:
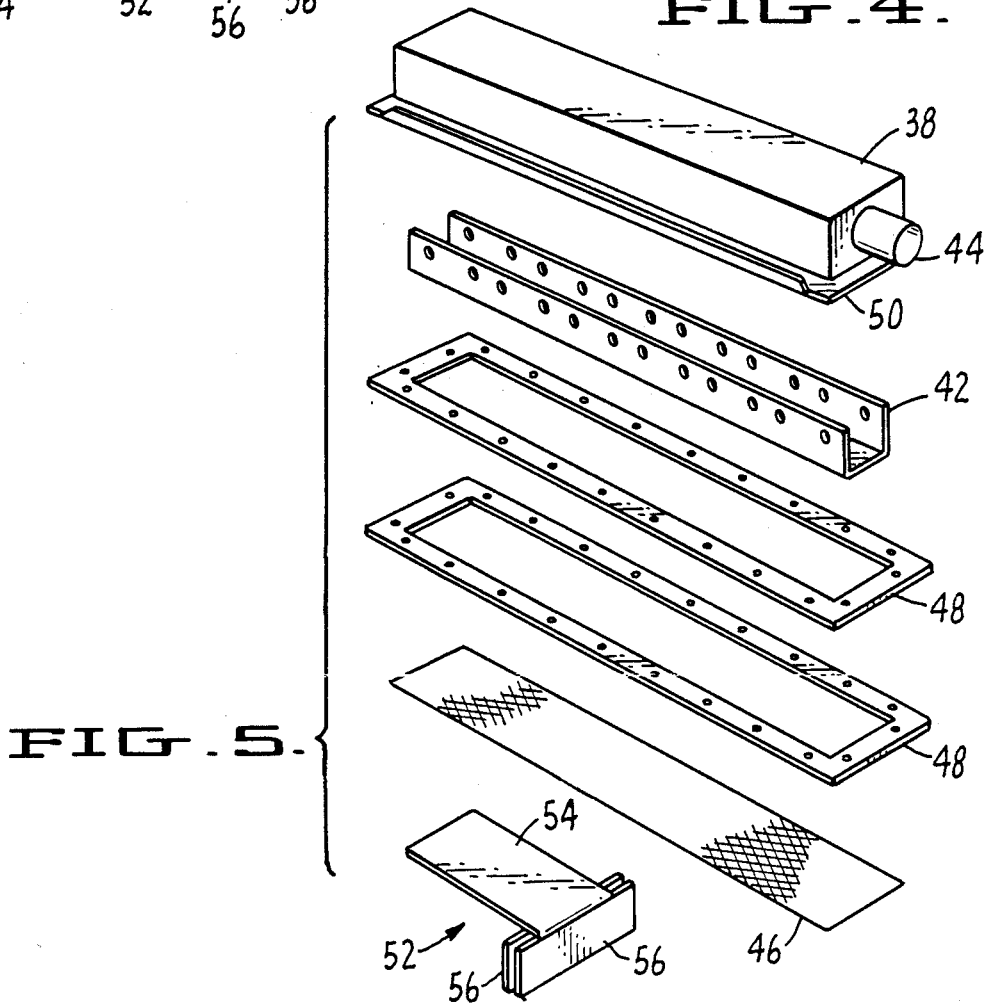
FIG. 5 is an exploded view of the parts of the broiler unit shown in FIG. 3.

With reference to FIG. 3, which illustrates the broiler 8 specifically, all of the broiler units 18–28 are identical except for the provision of the shield on the broiler 18 described below. The basic broiler units 18–28 have a plenum 38 with a closed side 40 and an open side 42. A gas distribution channel 42 is mounted in the plenum for distributing gas from a gas supply pipe 44, and a burner screen 46 is mounted over the open side 42 of the plenum for providing a heated surface at which combustion takes place.

The screen 46 is pre-assembled between a pair of frames 48 with a screen 46 spot welded between the frame 48, and this pre-assembled screen assembly is bolted onto a flange 50 surrounding the open side of the plenum 38. The plenum 38 channel 42 and frames 48 are preferable made of 304 stainless steel, and the screen 46 is preferably 30 mesh screen made of a 600 series stainless steel alloy.

Figure 2:
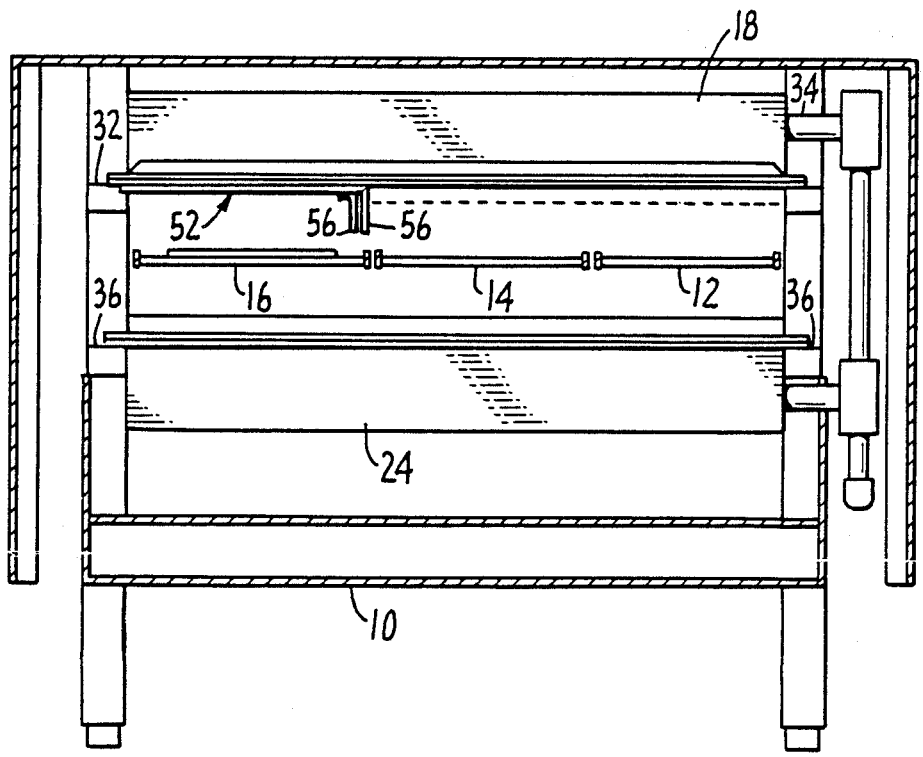
FIG. 2 is a cross-sectional view taken on the plane indicated at 2—2 in FIG. 1.

The burner units 20–28 are constructed as thus far described and may be interchanged when the broiler is disassembled for cleaning. The broiler unit 18 is also identical to the broiler units 20–28 as thus far described, but is further modified by the addition of a shield 52 which has a rectangular section 54 and a pair of extension blades 56. The rectangular section 54 fits into the opening of the frame 48 covering the screen 46 and is peripherally welded to the frame 48 to block off the open side of the plenum in the area where the rectangular section 54 overlies the screen. The blades 56 extend toward the adjacent edges of the conveyors 14 and 16 as best illustrated in FIG. 2 to prevent heat generated at the open side of the broiler 18 over the conveyors 12 and 14 from heating food on the initial section of the conveyor 16.

In this way, food products on the conveyor 16 may be subjected to a different cooking cycle from the food products on the conveyors 12 and 14 as for instance where the food on the conveyor 16 is a fish product in a shallow stainless steel pan which is subjected to a short cycle of baking and heating from the burner 24 before it is subjected to a final broiling stage under broiler units 20 and 22.

It will be apparent that the shields 52 may be applied to any selected section of the broilers 18–28 adjacent to any one or more of the conveyors 12, 14, and 16 to permit substantial flexibility in adapting the basic unit to simultaneous use on different food products.

What is claimed:

1. A gas burner unit adapted to be used in a gas broiler having at least two conveyors with food conveying runs positioned side by side with adjacent edges, and support means for removable mounting a plurality of gas burner units adjacent to and extending laterally across the food conveying runs, comprising:

a plenum having a length approximately equal to the combined widths of the conveyors, a closed plenum side and an open plenum side with the plenum having means for engaging the support means and supporting the open plenum side facing toward the conveyors, a shield attached to the plenum covering the open plenum side in the area adjacent to one of the conveyors for a portion of the length of the plenum approximately equal to the width of said one conveyor with the shield having a portion thereof extending away from the plenum toward the adjacent conveyor edges.

2. A gas broiler, comprising:

a frame, at least two conveyors mounted on the frame with food conveying runs positioned side by side with adjacent edges, support means on the frame for removable mounting a plurality of gas burner units adjacent to and extending laterally across the food conveying runs, a plurality of gas burners removably mounted on the frame with each of the gas burners having a plenum having a length approximately equal to the combined widths of the conveyors, a closed plenum side and an open plenum side and means for engaging the support means and supporting the open plenum side facing toward the conveyors, and a shield attached to the plenum of one of the gas burners covering the open side of said plenum in the area adjacent to one of the conveyors for a portion of the length of the plenum approximately equal to the width of said one conveyor with the shield having a portion thereof extending away from the plenum toward the adjacent conveyor edges.

* * * * *